(12) United States Patent
Ciancaglini

(10) Patent No.: US 9,051,195 B2
(45) Date of Patent: Jun. 9, 2015

(54) METHODS TO SEQUESTER HYDROCARBONS AND TO PROTECT A MEDIUM FROM HYDROCARBON CONTAMINATION

(71) Applicant: Ricardo Horacia Ciancaglini, Buenos Aires (AR)

(72) Inventor: Ricardo Horacia Ciancaglini, Buenos Aires (AR)

(73) Assignee: R. Ciancaglini y Associados SA, Buenoas Aires (SA)

( * ) Notice: Subject to any disclaimer, the term of this patent is extended or adjusted under 35 U.S.C. 154(b) by 47 days.

(21) Appl. No.: 14/065,349

(22) Filed: Oct. 28, 2013

(65) Prior Publication Data
US 2014/0291251 A1    Oct. 2, 2014

Related U.S. Application Data

(62) Division of application No. 12/133,165, filed on Jun. 4, 2008, now Pat. No. 8,567,613.

(30) Foreign Application Priority Data

Jun. 4, 2007    (AR) ................. P070102398

(51) Int. Cl.
| | | |
|---|---|---|
| *C02F 1/28* | (2006.01) | |
| *C10G 25/00* | (2006.01) | |
| *B01D 15/00* | (2006.01) | |
| *B01J 20/24* | (2006.01) | |
| *B01J 20/28* | (2006.01) | |
| *B01J 20/30* | (2006.01) | |
| *B09C 1/00* | (2006.01) | |
| *B01D 39/00* | (2006.01) | |
| *C07C 7/12* | (2006.01) | |
| *C02F 101/32* | (2006.01) | |
| *C02F 103/00* | (2006.01) | |

(52) U.S. Cl.
CPC ............. *C02F 1/286* (2013.01); *B01D 15/00* (2013.01); *B01J 20/24* (2013.01); *B01J 20/28004* (2013.01); *B01J 20/28016* (2013.01); *B01J 20/28023* (2013.01); *B01J 20/28033* (2013.01); *B01J 20/3021* (2013.01); *B01J 2220/4862* (2013.01); *B09C 1/00* (2013.01); *C02F 1/28* (2013.01); *C02F 2101/32* (2013.01); *C02F 2103/007* (2013.01); *C10G 25/006* (2013.01)

(58) Field of Classification Search
CPC ..... B01D 15/00; C02F 1/286; C02F 2101/32; C02F 1/28; C02F 2103/007; B01J 20/24; B01J 20/28004; B01J 20/28016; B01J 20/28023; B01J 20/28033; B01J 20/3021; B01J 2220/4862; C10G 25/006; B09C 1/00
See application file for complete search history.

(56) References Cited

U.S. PATENT DOCUMENTS

| | | | | |
|---|---|---|---|---|
| 4,102,783 | A * | 7/1978 | Zenno et al. | 210/691 |
| 4,439,324 | A * | 3/1984 | Crotti | 210/691 |
| 4,512,890 | A * | 4/1985 | Medbury | 210/335 |
| 4,759,847 | A * | 7/1988 | Medbury | 210/484 |
| 4,919,820 | A * | 4/1990 | Lafay et al. | 210/671 |
| 5,078,890 | A * | 1/1992 | Conche et al. | 210/691 |

(Continued)

*Primary Examiner* — John Kim
(74) *Attorney, Agent, or Firm* — Sulzer, Green & Taylor PLLC

(57) ABSTRACT

A hydrocarbon sequestering product, a method to obtain the product, and a method and a facility to sequester hydrocarbons, wherein the product comprises an oleophilic filamentous material that gets in contact with a medium contaminated by one or more hydrocarbons with the purpose of sequestrating the hydrocarbon(s) present in the medium to free it from said hydrocarbons.

24 Claims, 2 Drawing Sheets

(56) References Cited

U.S. PATENT DOCUMENTS

| | | | |
|---|---|---|---|
| 5,215,407 A * | 6/1993 | Brelsford | 405/63 |
| 5,252,215 A * | 10/1993 | McFarlane et al. | 210/691 |
| 5,348,661 A * | 9/1994 | Hill | 210/680 |
| 5,374,600 A * | 12/1994 | Hozumi et al. | 502/402 |
| 5,466,379 A * | 11/1995 | Schiwek | 210/680 |
| 5,705,030 A * | 1/1998 | Gassner et al. | 162/2 |
| 5,795,842 A * | 8/1998 | Sundquist | 502/400 |
| 5,954,841 A * | 9/1999 | Beven | 8/139 |
| 6,080,307 A * | 6/2000 | Morris et al. | 210/163 |
| 6,143,172 A * | 11/2000 | Rink et al. | 210/237 |
| 6,187,581 B1 * | 2/2001 | Sicotte et al. | 435/262 |
| 6,344,519 B1 * | 2/2002 | Rink et al. | 525/97 |
| 6,706,531 B1 * | 3/2004 | Haeseler et al. | 436/139 |
| 6,770,285 B2 * | 8/2004 | Keenan et al. | 424/401 |
| 6,780,631 B2 * | 8/2004 | Renaker, Jr. | 435/262 |
| 6,827,948 B2 * | 12/2004 | Stoltz | 424/543 |
| 7,048,878 B2 * | 5/2006 | Rink et al. | 264/41 |
| 7,229,560 B2 * | 6/2007 | Rink et al. | 210/693 |
| 7,258,797 B2 * | 8/2007 | Burton et al. | 210/689 |
| 7,883,625 B2 * | 2/2011 | Harman et al. | 210/660 |
| 7,938,963 B2 * | 5/2011 | Klein et al. | 210/295 |
| 2001/0027952 A1 * | 10/2001 | Ciancaglini et al. | 210/660 |
| 2009/0050331 A1 * | 2/2009 | Mahler et al. | 166/372 |

* cited by examiner

METHODS TO SEQUESTER HYDROCARBONS AND TO PROTECT A MEDIUM FROM HYDROCARBON CONTAMINATION

CROSS REFERENCE TO RELATED APPLICATIONS

This application is a divisional of U.S. application Ser. No. 12/133,165, filed Jun. 4, 2008 now U.S. Pat No. 8,567,613, which claims the benefit of the filing date of foreign Argentine Application No. P070102398 filed on Jun. 4, 2007 both of which are incorporated herein by reference.

FIELD OF THE INVENTION

This invention relates to decontamination techniques and, especially, the useful means, methods and facilities to collect fluids and liquids from one or more hydrocarbons spilled on different surfaces, as well as to free solids, fluids and liquids from one or more hydrocarbons adhered to them, while said sequestering agents have at least in some of their applications, fire-resistant characteristics.

BACKGROUND OF THE INVENTION

Today, one of the most significant contamination problems is that caused by hydrocarbons, whether they are spilled onto the soil or into seas and rivers. When they are spilled onto soil, the layer of polluted soil is usually removed and subjected to ulterior treatment. Until it is treated, this soil is accumulated in large piles representing a substantial liability and cost to companies. This further involves substantial soil movement consisting of both permeated and clean soil, which causes a considerable alteration to the ecosystem and high operating costs.

In the case of contaminated water, when it is fresh water, it is no longer suitable for consumption or irrigation and, when it is sea water, it directly impacts on marine or coastal life. In the case of water present deep in the substratum, it is extracted through oil well production and can then be reinjected into the reservoir in secondary oil recovery procedures. This reinjected water must not contain oil as the latter entrains solid fines that later affect the permeability of the formation and, thus, the well's productivity.

In order to decontaminate this water, complex filter systems have been developed that, as it usually happens with all filters, end up quickly occluded or blocked by the hydrocarbon and trapped particles. To maintain the operating range of the plant, the circulation pressure of the contaminated liquid must be raised to keep the flow; however, as there is insufficient pressure, the system stops functioning. Although it is always possible to increase the pressure, the pressure values reached would exceed the resistance of the filter meshes, leading to their rupture and the stoppage and/or failure of the entire system.

Even though there are techniques using enzymes or bacteria that degrade the oil, they are not commercially profitable due to their elevated cost.

There are other techniques that have used bird feathers due to their high oil sequestering potential when in contact with it; but, as we will see in the following documents, they have all used whole feathers in their natural state and, although this has yielded good results, the oil collection capability can still be improved, as proven by the inventors of this product.

Indeed, among these techniques that have failed to achieve the desired results—as evidenced by their lack of application in the most widely-known markets—is U.S. Pat. No. 4,439,324 that discloses an oil collection method by using bags full of loose bird feathers. This patent does not provide for the grinding of these feathers.

U.S. Pat. No. 4,919,820 refers to a method similar to the previous one, consisting of filling mesh bags with duck feathers, where bags are interconnected between each other and have float devices to delimit and collect oil floating on a surface. U.S. Pat. No. 5,348,661 describes a similar but more complex method, based on preparing a mesh carrier with oil adsorptive and collection material inside arranged in cells within the carrier. The oil adsorptive material is spray coated with an adhesive so as to be kept inside the carrier bags. Then, as in other known procedures, it is spread over the water surface where the spilled oil is to be collected.

Finally, U.S. Pat. No. 4,512,890 describes a filtering device to separate an oily substance, like oil, from water, consisting of an outer case with an inlet and an outlet holding a filter formed by a layer of laminar material and feathers to catch the oily fluid. This results in the usual occlusion of the filter plate due to its position crosswise to the flow of liquid, acting as a plug. The feather is all the same used in its natural state.

Another defect of the products and systems of the prior art, specially those described hereinabove and, more specifically, those using bags with sequestering material that ends up permeated with the oil, is that these final permeated products are a potential hazard both for transportation and disposal or temporary storage due to their inflammableness.

In view of the current state of technique available for hydrocarbon separation from contaminated solid or liquid media, it would be quite convenient to have an affordable and effective hydrocarbon sequestering product that further allows implementing simple hydrocarbon sequestering methods that can be carried out efficiently, cost-effectively, quickly and in plain low-cost operating and maintenance facilities.

SUMMARY OF THE INVENTION

Therefore, one of the purposes of this invention is to provide a new technology that allows the recovery of a hydrocarbon-contaminated medium as well as the use of hydrocarbons separated through the invention, which consists of a new low-cost, low production and low operation oleophilic product.

Another purpose of this invention is to provide a hydrocarbon sequestering product, a method to obtain the product and a method and a facility for hydrocarbon sequestration, where the product consists of an oleophilic filamentous material that comes into contact with a medium contaminated with one or more hydrocarbons present in it to free it from these hydrocarbons.

Another purpose of this invention is to provide a hydrocarbon sequestering product of the type that comes into contact with a medium contaminated with one or more hydrocarbons to sequester the hydrocarbons present in it, and to free it from said hydrocarbons, where the product consists of a powdered material formed by ground oleophilic filaments, either from bird feathers or sheep wool.

Yet another purpose of this invention is to provide a hydrocarbon sequestering product preferably to come into contact with a medium contaminated with one or more hydrocarbons, to sequester the hydrocarbons present in it and free it from said hydrocarbons, where the product consists of a powered material formed by ground oleophilic filaments, either from bird feathers or sheep wool and mixes thereof; where the product comes wrapped in a fire-resistant fabric material, forming blankets or sheets, to be either extended over the hydrocarbon spill, whenever it forms blankets, or to form filter boxes, when it shapes as sheets.

Yet another purpose of this invention is to provide a method to obtain the sequestering product mentioned above, consisting of taking an oleophilic filamentous material, such as bird feathers or sheep wool, grind the oleophilic filamentous material until filaments are finely divided, for instance, between 6 and 60 microns.

Yet another purpose of this invention is to provide a method to sequester at least one hydrocarbon from a medium contaminated with it through the use of the above-mentioned oleophilic product, where the method consists of putting such contaminated medium in contact with said sequestering product during enough time until at least one hydrocarbon comes loose from the contaminated medium. This medium may be solid, in which case the oleophilic product may become mixed with the contaminated medium; or it may be liquid, in which case the oleophilic product may form packs of plates with a separation between them through which the contaminated medium flows.

Yet another purpose of this invention is to provide a hydrocarbon sequestration facility using the sequestering product mentioned above, which includes at least a separation unit of no less than one hydrocarbon, consisting of a pack of thin sheets formed by said sequestering product and arranged one next to the other leaving a space between them for the passage of the contaminated fluid with the above-mentioned hydrocarbon.

Various embodiments of the invention provide a hydrocarbon sequestering product that comes into contact with a medium contaminated by one or more hydrocarbons in order to free the hydrocarbons from the medium. The product can include a material including oleophilic filaments in micro-particle or powder form. The micro-particle or powder form can be achieved, for example, by grinding. The material can include for example, bird feathers, sheep wool and the like, and mixes thereof. In some embodiments, the product can include a material having a particle size between about 5 and 10 microns. In other embodiments, the particle size can be between 10 and 60 microns, or between 60 and 125 microns, or more. For example, particle sizes of about 2, 4, 6, 8, 12, 15, 20, 25, 30, 35, 40, 45, 50, 55, 65, 75, 100, and 150 microns are also among embodiments of the invention. In various embodiments, the material can be found for example with a surface of about 300 to 500 mm$^2$ for each mm$^3$ of volume, with a surface of about 350 to 450 mm$^2$ for each mm$^3$ of volume, or with a surface of about 375 to 425 mm$^2$ for each mm$^3$ of volume.

In some embodiments, the material can also include an emulsion such as, for example, an aqueous emulsion including, for example, a lanolin. The material can be contained in a fire-resistant textile material. The fire-resistant textile material can be a gauze, for example, and the hydrocarbon sequestering product can be wrapped or otherwise contained, enclosed, encased, in the gauze such that the hydrocarbon sequestering product can be a sheet such as, for example, a thin sheet. The fire-resistant textile material can include a cotton; the hydrocarbon sequestering product can be an absorbing blanket.

Also provided in embodiments of the invention are methods of manufacturing a hydrocarbon sequestering product which includes providing an oleophilic filamentous material and grinding the oleophilic filamentous material to particles having a size substantially within a range from 6 to 60 mircons, or more. For example, particle sizes of about 2, 4, 6, 8, 12, 15, 20, 25, 30, 35, 40, 45, 50, 55, 65, 75, 100, and 150 microns are also among embodiments of the invention. In another embodiment of manufacturing a hydrocarbon sequestering product, the oleophilic filamentous material is sterilzied, for example, with at least one chlorine solution, a formol-based biological stabilization, drying, grinding, crushing, and spraying with an aqueous emulsion of lanolin. Further emodiements of the method of manufacturing a hydrocarbon sequestering product have an oleophilic filamentous material that can be wrapped or otherwise contained, enclosed, encased, in in a gauze such that the hydrocarbon sequestering product can be a sheet such as, for example, a thin sheet. The oleophilic filamentous material can also be wrapped or otherwise contained, enclosed, encased, in a fire-resistant textile material. In some embodiments, a hydrocarbon sequestering product includes a fire-resistant textile material, which for example, includes a scoured cotton material having an improved absorption capcity that is treated with a fire-resistant agent. In other embodiments, the oleophilic filamentous material is a sheep wool that is ground into particles, or the oleophilic filamentous material is a feather, for example a poultry feather or the like, from which the quill is separated therefrom and the resulting feather is ground into particles.

Other embodiments of the invention inlclude methods for using a hydrocarbon sequestering product. For example, one embodiment sequesters at least one hydrocarbon from a medium contaminated by at least one hydrocarbon by placing a hydrcarbon sequestering product including ground oleophilic filiaments in micro-particle or powder from in contact with a contaminated medium and allowing the hydrocarbon sequestering product to remain in contact with the contaminated medium for a period of time such that at least one hydrocarbon is freed from the contaminated medium. In another embodiment, a mixture is made by dry mixing the contaminated solid with 0.4 wt % to 2 wt % of the hydrocarbon, adding water to the mixture until the mixture, to a point for example such that the mixture is saturated, agitating the mixture, allowing free solids from at least one hydrocarbon to settle at the bottom of the mixture, allowing the hydrocarbon sequestring product to float with at least one such hydrocarbon adhered thereto, removing by any effective means the hydrocarbon sequestering product with at least one such hydrocarbon adhered thereto, and removing by any effective means such free solids from at least one such hydrocarbon.

Other embodiments for manufacturing a hydrocarbon sequestering product include providing the hydrocarbon sequestering product in the form of at least two sheets, placing the sheets in a contaminated liquid such that there is sufficient space between the sheets for the contaminated liquid to flow through and allowing the contaminated liquid to flow through the space so that at least one such hydrocarbon is sequestered by the sheets.

In other embodiments for using a hydrocarbon sequestering product, a facility, for example a facility offsite from a contamined area is used. In this embodiment, the facility has a separation unit that uses a hydrocarbon sequestering product including ground oleophilic filaments in microparticle, powder form or in a sheet form in the separation unit. If for example sheets are used, the sheets are placed in the separation unit such that there is sufficient space between the sheets for a contaminated fluid to flow through. In additional embodiments, the hydrocarbon sequestering product can be formed into a compacted mass of the hydrocarbon sequestering product with the thin sheets. Other embodiments for using a hydrocarbon sequestering product such as a facility offsite from a contaminated area, have an agitation tank, a liquid injector connected to the agitation tank, an inlet in the agitation tank, a mixing container located at the inlet, a settling tank connected to the agitation tank such that liquids in the agitation tank flow into the settling tank, a bottom oulet in the settling tank for solids adhered with hydrocarbons, an upper outlet in the settling tank for liquids adhered with hydrocarbons and a sieve connected to the outlets in the settling tank such that the sieve traps the solids adhered with hydrocarbons and the liquids adhered with hydrocarbons, an outlet in the sieve connected to a pipeline through which cleaned products travel.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Figure 1:
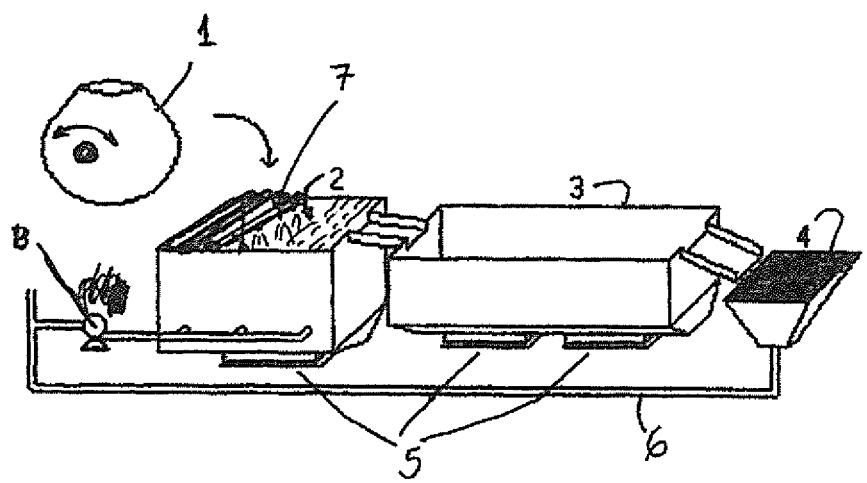
FIG. 1 shows a basic diagram of an installation or facility to sequester hydrocarbons from contaminated solid media, pursuant to one of the preferred embodiments of the invention.

The detailed description provided herein establishes that the invention comprises a hydrocarbon sequestering product preferably used to recover spilled hydrocarbons and also to cleanup solids and liquids with high hydrocarbon content at very low cost and very effectively. The essential product may vary in its respective applications relative to collecting spills or separating hydrocarbons from solids and liquids but, basically, it is comprised by a filamentous and micro-particle or powdered material that consists of ground oleophilic filaments preferably obtained from ground bird feathers, quills removed, and/or sheep wool.

The sequestering product of the invention is obtained from processing poultry feathers to obtain filaments therefrom but leaving quills aside. This product is oleophilic and provides an ample specific surface, imperative characteristics for the sequestering and separation procedures of the invention. Oleophilia or preferred wettability with hydrocarbons, just like its opposite, hydrophilia or wettability with polar liquids, such as water, is an inherent quality of the material. In this case, the inventors have established that feathers are distinctly oleophilic because they are permeated with an oily substance segregated by the preen gland of birds. The values of the specific surface—the smaller the size of the object, the larger the specific surface—, or its diameter for practical purposes, are very high. Actually, the diameter of the filaments of the product of the invention ranges from 5 to 10 microns, approximately, equivalent to approximately a surface of 400 mm2 for each mm3 of volume.

According to the invention, feathers are subject to a process that begins by a sterilization with chlorine solutions followed by a formula-based biological stabilization. When the drying stage is completed, feathers are subject to grinding and crushing where quills are removed and, as the final material exits, an aqueous emulsion spray of lanolin, olein or a similar substance is applied over them to restore their oily property that might have been reduced in previous stages. When this process is over, the product is bagged in bulk ready to use. This product is preferably applied to collect spills and/or sequester hydrocarbons in solids while separation in liquids requires alterations that shall be described hereinbelow.

One of the advantages of the method of the invention lies on the fact that it does not take bird breast or similar feathers because the crushing process accepts any size and delivers a uniform and stable product with greater absorption capacity by unit of weight or volume than that of non-processed feathers. This product may be used, as we will see, in a variety of embodiments and methods. For example, it may be part of blankets of different sizes used to cover the soil before the deployment in place of oil pit equipment. Once tasks producing large quantities of oil are completed, the resulting spills are trapped in the blankets used as carpets, which may be removed leaving no trace of waste on the ground next to the oil pit. In another direct use, the product may be bagged to form floating barriers to stop spills in the ocean, lakes, rivers, etc., an already well-known technique using feathers in their natural state. The sequestering property of the ground product of the invention is several times greater than that of feathers in their natural state not only because the product of the invention has greater absorption qualities but also because it is lighter an has less volume. In some cases, preferably in blankets, also in accordance with the invention, the textiles used to form blankets or sheets shall be treated to become fire resistant.

In accordance with one of the methods of the invention, the hydrocarbon particles in solids, such as soil, are sequestered using the absorbent oleophilic product described hereinabove. As mentioned above, the product is made up of feather filaments extracted during the process of purification and grinding of poultry feathers, a scrap of industrial animal slaughter. As a result of this, a ground filamentous product is obtained free from feather quills, already removed. Using a hydrocathon sequestration embodiment, also according to the invention and schematically illustrated in FIG. 1, the polluted material is placed in a rotating unit 1 similar to a cement mixer onto which the sequestering product is added in a percentage ranging from 0.4% to 2% of its weight. In a first stage, the rotation movement mixes product and solids and, in a second stage, water sprays or jets are applied to saturate the mix while the rotating unit continues in operation to put in contact the product and the polluting hydrocarbon in the solids. The purpose of the spray is to soften solids and favor contact thereof. The outcome may be seen at first glance because the product quickly turns black as it absorbs the oil and results in a wet mass.

When the wet mass is sufficiently mixed it goes to an agitation tank 2 where solids are separated by water injection—for example, by means of injectors 7 all over the top of the tank—and the hydrocarbon is fully exposed to be absorbed by the product. Then, the content of this tank is driven to a settling tank 3 where most of the solids settle at the bottom and the liquid with the product with the adhered hydrocarbon overflows to a sieve 4 that traps the product with adhered hydrocarbon and lets the water pass and flow back through a return pipeline 6 propelled by a pump "B" to be reused at the beginning of the process. When the deposit of solids reaches a certain level, the settling tank 3 is turned over as it rotates on a shaft and the set of stones, sand and mud, free from hydrocarbons, is transported back to the places where they came from to be spread out over the surface. Similarly, the tank may be emptied using the big lock valves 5 located at the bottom of the tank, as FIG. 1 shows.

The residue of the product with high hydrocarbon content is bagged and delivered for final disposal to cement producers, for example. 'Klinker' furnaces easily take in this material and benefit from a low cost source of power. Not only do they save power generation but they receive already wasted power obtained from a polluting agent. The product incinerates almost completely leaving only 3% solid residue. This small amount of residue no longer represents an environmental problem.

As already mentioned above, the product, embodiment and methods of this invention are also capable of separating hydrocarbons from liquids and, more specifically, decontaminate liquids, particularly hydrocarbon polluted water. For this purpose, the sequestering product of the invention may adopt the shape of thin plates or sheets wrapped, for example, in a suitable media such as gauze. This peculiar construction provides the necessary characteristics to obtain satisfactory outcomes such as a large surface of contact and preferred wettability with hydrocarbons. The large surface of contact is obtained by maximizing the superficial density or the surface by unit of volume. This is possible using elements of very scarce diameter such as filaments. The preferred wettability is an inherent characteristic of a material that can get more easily wet by polar liquids, such as water, and for that reason be called hydrophilic, or by non-polar liquids such as hydrocarbons, oleophilic. If oleophilia is very evident, even if the material has been previously wetted in water, when it gets in contact with hydrocarbons, the water drops shall leave room on the surface for hydrocarbons. As explained above, the raw material of plates is sheep wool and/or poultry feather, in the latter, filaments are obtained and quills are discarded, and in the former, the thick tufts of wool That reduce the absorption capacity are split up. Thus, the free filanients of 6 to 60 microns diameter obtained provide very high specific surface values of approximately 400 mm2 of surface for each mm3 of volume. The oleophilic property is inherent both to wool and feathers. However, when the cleanup and disinfection process using chlorine solutions and the formula-based biological stabilization process are completed, in addition to the chipping and grinding stage, an additive must be applied to recover the oleophilic properties of filaments and make up for their loss of oil during these operations, in this case, lanolin, the natural oil found in wool, is applied over the product in an aqueous emulsion spray.

The cleanup and disinfection process are necessary because feathers come from slaughtering houses in their natural state. The object of biological stabilization is to delay the oil content from turning rancid and producing a relatively fast putrefaction of the material. The secondary outcome is a clear colored homogenous product 10 with a better visual impact. Finally, an aqueous solution spray is applied over the mix of filaments, and they are wrapped in gauze sown to make plates of different thickness, either compacted or not. A stiff bar that shall act as a mast-type stand or pole is added on one of the borders of the plate.

Figure 2:
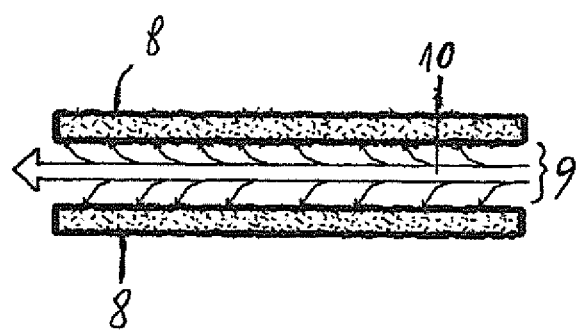
FIG. 2 shows a block diagram of a pair of sheets or plates for sequestering hydrocarbons from contaminated liquids, pursuant to another preferred embodiment of the invention.
Figure 3:
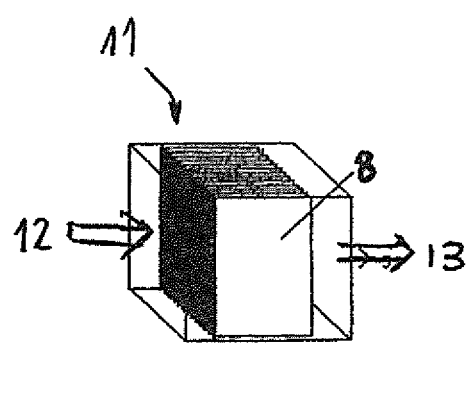
FIG. 3 shows a diagram of a pack of sequestering plates or sheets of FIG. 2 for a horizontal flow of contaminated liquid, always according to the invention.
Figure 4:
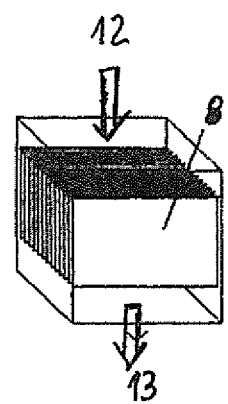
FIG. 4 shows a diagram of a pack of sequestering plates or sheets of FIG. 2 for a vertical flow of contaminated liquid, also always according to the invention.

The method to sequester hydrocarbons from hydrocarbon-polluted liquids according to the invention comprises a separator, as FIGS. 2, 3 and 4 show, formed by a series of oleophilic sheets or plates marked with the reference number 8, that are set one next to the other in parallel and leaving a space 9 between them to avoid interrupting the fluid to be treated, like conventional filters do, but the plates 8 are organized in parallel to the flow and operate by means of superficial absorption. It does not impose filtering but it induces separation. As FIG. 2 shows, where the rest of the sheets are not illustrated for the sake of the clarity of the drawing, the two absorbent oleophilic sheets 8 are set in parallel to the fluid stream 10, and the hydrocarbon particles at the mere contact with them without stopping the fluid drops. These sheets may be made of the compacting of the sequestering product of the invention either without wrapping or wrapped in a textile, such as gauze, and the wrapping may be suitably treated to become fire-resistant, as described hereinafter, also according to the invention.

As seen in FIGS. 3 and 4 a separation unit 11 may be made up of several of these plates 8 organized lenghtwise, one next to the other, in the direction of the liquid flow to be treated, leaving a small gap between them, anchored, for example, by a pole or rod, not illustrated in the figure, that sets them in place and holds them on both sides of the separation unit. The polluted liquid 12 enters the separation unit and flows through the adjacent plates 8. The hydrocarbon particles come into contact with the absorbent oleophilic plates 8 and are immediately trapped therein and thus they are separated from the fluid stream that exits clean, as indicated in reference 13. Permeated sheets may then be used in various applications as described hereinabove. If submitted to the fire-resistant treatment, according to the invention, they may be safely stored for future use.

As FIG. 4 shows the method and embodiment of the invention also foresee operations with vertical flows, in which case they should preferably be descending flows to provide an extra benefit, in addition to the benefits mentioned above, due to the favorable difference of density between hydrocarbons and the water under treatment since hydrocarbons tend to flow relatively, a fact that translates into a slower descending speed or more time in the unit and greater chance to contact one of the oleophilic sheets.

Horizontal operation is suitable to remediate water streams such as drainages, streams and rivers where the minimum load loss produced by this system shall be noticeable and prevent overflows. In such cases, covering the whole stream subject to remediation with sufficient packs of plates in vertical position in the direction of the flow is enough.

In both applications, as an area of the sheet becomes saturated, it lets the fluid flow without further opposition, and the process continues as the fluid flows to other non-saturated areas and successively so until the separator is completely saturated, a condition arising only after a long period of operations and, only at that point, the permeated sheets shall be replaced.

As mentioned above, sheets or plates may be manufactured in different size, shape and thickness, and the sequestering product therein may be compacted or rather loose. If the invention is used in the shape of blankets or carpets on the soil next to oil pits, they must have the quality of being easily collapsible and extensible before the equipment and personnel begin spill-producing operations.

Blankets shall comprise the sequestering product of the invention wrapped or inserted in containers as bags. These wrappings shall preferably be made of textiles, such as gauze or, more preferably, pure cotton fabrics. Also according to the invention, these fabrics or wrappings are subject to a fire-resistant treatment so that handling, transporting, using, storing, etc. is not be potentially dangerous. For that purpose, textiles such as pure cotton fabrics are subject to a scouring process to obtain greater effectiveness or absorption property. This improved property of absorption shall be useful when a fire retardant spray is applied over the fabric so the fire retardant product persists in the cotton fibers and the fabric finally results fire-resistant. Is it worth noticing that this treatment is not necessary for the feather sequestering product because, feathers have the natural property of being self extinguishable.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed :

1. A method to sequester hydrocarbon from a medium contaminated by said hydrocarbon, said method comprising:
   a. placing a hydrocarbon sequestering product comprising ground oleophilic filaments in micro-particle or powder form in contact with said contaminated medium, said product comprising sterilized and stabilized ground feather-filaments, said ground feather-filaments having no quills and obtained from feathers by:
      grinding the feathers-filaments to produce a ground product free from quills,
      sterilizing the ground product;
      stabilizing the ground product; maintaining a natural oily property of the feather filaments by application of an aqueous emulsion, and
   b. maintaining said hydrocarbon sequestering product in contact with said contaminated medium for a period of time such that at least some hydrocarbon is freed from said medium.

2. A method as recited in claim 1 wherein said medium is a liquid.

3. A method as recited in claim 1 wherein said medium is a solid and the product is mixed with the contaminated medium.

4. A method as recited in claim 2 wherein said ground product has a particle size of about 150 microns.

5. A method as recited in claim 2 wherein said ground product has a particle size in a range of about 6 to 60 microns.

6. A method as recited in claim 3 wherein said ground product has a particle size of about 150 microns.

7. A method as recited in claim 3 wherein said ground product has a particle size in a range of about 6 to 60 microns.

8. A method as recited in claim 4 in which said product comprises a blanket.

9. A method as recited in claim 6 in which said product comprises a blanket.

10. A method as recited in claim 1 which further includes transporting said product for incineration after prolonged contact with a contaminated medium.

11. A method as recited in claim 1 in which said product is wrapped in a textile covering.

12. A method as recited in claim 11 in which said textile is gauze.

13. A method as recited in claim 12 in which said textile is cotton.

14. A method as recited in claim 13 in which said cotton is treated with a fire retardant.

15. A method to protect a medium from hydrocarbon contamination, said method comprising:
   a. placing a hydrocarbon sequestering product comprising ground oleophilic filaments in micro-particle or powder form in contact with said medium to be protected;
   b. placing said product so that the product lies between said medium and a source of said contamination;
   c. said product comprising sterilized and stabilized ground feather-filaments, said ground feather-filaments having no quills and obtained from feathers by:
      grinding the feathers-filaments to produce a ground product free from quills,
      sterilizing the ground product,
      stabilizing the ground product, and maintaining a natural oily property of the feather filaments by application of an aqueous emulsion.

16. A method as recited in claim 15 wherein the product is in blanket form.

17. A method as recited in claim 15 wherein the ground product has a particle size of about 150 microns.

18. A method as recited in claim 15 wherein the ground product has a particle size in a range of about 6 to 60 microns.

19. A method as recited in claim 15 which further includes transporting said product for incineration after prolonged contact with hydrocarbon.

20. A method as recited in claim 15 in which said product is wrapped in a textile covering.

21. A method as recited in claim 20 in which said textile is gauze.

22. A method as recited in claim 21 in which said textile is cotton.

23. A method as recited in claim 22 in which said cotton is treated with a fire retardant.

24. A method as recited in claim 20 which further includes transporting said product for incineration after prolonged contact with hydrocarbon.

* * * * *